No. 869,912. PATENTED NOV. 5, 1907.
W. J. KNIGHT & E. S. JOHNSON.
CUTTER HEAD FOR DREDGES.
APPLICATION FILED NOV. 10, 1906.

WITNESSES:
F. C. Fliedner
C. P. Sonntag

INVENTORS
William James Knight
Edwin Samuel Johnson
BY
Lincoln Sonntag
ATTORNEY

UNITED STATES PATENT OFFICE.

WILLIAM JAMES KNIGHT AND EDWIN SAMUEL JOHNSON, OF OAKLAND, CALIFORNIA

CUTTER-HEAD FOR DREDGES.

No. 869,912.  Specification of Letters Patent.  Patented Nov. 5, 1907.

Application filed November 10, 1906. Serial No. 342,912.

*To all whom it may concern:*

Be it known that WILLIAM JAMES KNIGHT and EDWIN SAMUEL JOHNSON, citizens of the United States, residing at Oakland, in the county of Alameda and State of California, have invented certain new and useful Improvements in Cutter-Heads for Dredges, of which the following is a specification.

Our invention relates to improvements in cutter heads for dredges.

The objects of our invention are to provide a cutter head for dredges which will cut up the material to be carried away by suction or other appropriate means with the use of less power than heretofore used for the accomplishment of the purpose; which possesses great strength, operates uniformly and does not drag or clog, and which upon contact with the material will immediately commence and continue the operation of cutting irrespective of the hardness of the material usually encountered in the operation of dredging.

Our invention consists in the novel combination and arrangement of parts described in the following specification, illustrated in the accompanying drawing, and claimed in the appended claims.

Figure 1:
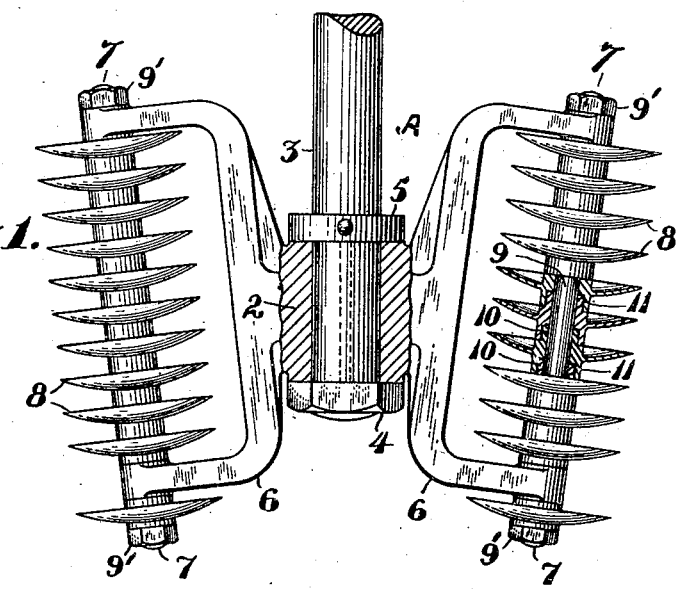
Figure 2:
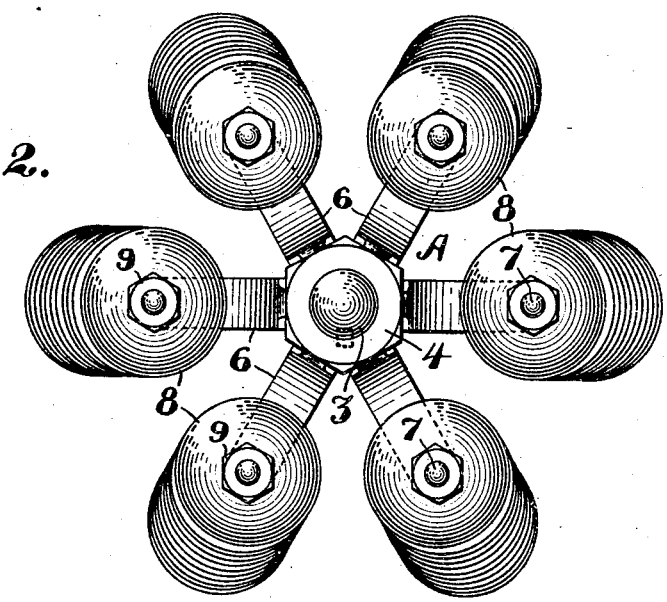

Referring to the drawings Figure 1 is a perspective view of our rotary cutter head having parts thereof cut away to show the construction of certain parts hereinafter described. Fig. 2 is an end view of our device.

In said drawing A shows said rotary cutter head having a hub 2 keyed to a shaft 3. The said hub is held in position by the nut 4 at one end and the collar 5 at the other end and is rigidly secured to said shaft so as to rotate with the same. The hub 2 has a plurality of bifurcated arms 6. The arms 6 support shafts as shown at 9 by encircling the same, the said shafts having ends or studs 7. The said shafts are secured longitudinally to the arms 6 by the nuts 9 attached to the studs 7. The shafts 9 support a plurality of disks 8, the latter revolving on said shafts. Each disk 8 is provided with a hub as shown sectionally in Fig. 1.
The said hub so shown has at one end an annular groove or recess 11 and at the other end is provided with an annular projection 10. The projection 10 of one hub projects into the recess 11 of the adjoining hub, fitting therein in such manner as to prevent foreign matter from entering upon shaft 9, which might otherwise cause the rapid wearing of the shaft. By one hub fitting into the other as explained in case of the breaking of a disk 8, another may be readily inserted in its place by unscrewing nuts 9' and withdrawing shaft 9 for the insertion of said disk.

The objects of our invention are attained by the mechanism described, its operation being carried on by the rotation of shaft 3, shown as broken away in Fig. 1 connected to a suitable machine for dredging.

We prefer for our device the inclined arms 6 and the plano-convex disks 8 whereby we attain the greatest effectiveness in cutting and freeing of material for removal, it being obvious that the rotation of the disks when passing through the material considerably reduces friction and consequently less power is required for the operation of the disks, while their inclination as shown will facilitate the freeing of said material and tend to force it in the desired direction, for removal, but the form of our device may be modified without departing from the spirit of our invention and therefore we reserve our rights to all modifications of the device which fall within the spirit and scope of our invention.

Having thus described our invention, we claim:

1. In a cutter head for dredges in combination with the shaft for rotating the device, a plurality of arms centrally secured to said shaft and means arranged for rotation rigidly supported by said arms for separating material for removal.

2. In a cutter head for dredges in combination with the shaft for rotating the device, a plurality of inclined arms centrally secured to said shaft, and means arranged for rotation supported by said arms for separating material for removal.

3. In a cutter head for dredges in combination with the shaft for rotating the device, a plurality of equidistant arms centrally secured to a hub affixed to said shaft, and separable means arranged for rotation supported within said arms for separating material for removal.

4. In a cutter head for dredges, the combination with a shaft, a series of inclined arms centrally secured to said shaft, disk-carrying shafts mounted in said arms, and a plurality of disks mounted on said disk-carrying shafts, each of said disks having a hub provided on one end with an extension and on the other end with a socket whereby the series of disks on each disk-carrying shaft interfit together.

5. In a cutter head for dredges, the combination with a shaft, and a series of bifurcated arms secured to said shaft, of disk-carrying shafts rotatably mounted in said arms, and a series of disks mounted on each disk-carrying shaft, the hub of each disk interfitting with the hubs of the adjacent disks.

6. In a cutter head for dredges, the combination of a shaft, a hub secured thereon, a bifurcated arm arranged at an incline to the shaft and secured centrally of its ends to said hub, a disk-carrying shaft mounted in said arm, and a series of disks on said disk-carrying shaft, each disk having its hub interfitting with the hubs of adjacent disks.

7. In cutter heads for dredges, a disk having a hub provided on one end with an extension and having a socket in its opposite end.

8. A cutter head for dredges, comprising a shaft, a hub secured thereto, a plurality of bifurcated arms secured intermediate their ends to the hub and disposed at an angle to the shaft, disk-carrying shafts mounted in said arms and being also at an inclination to the said shaft, and a plurality of cutting disks arranged on said disk-carrying shafts, substantially as described.

9. In a cutter head for dredges, a shaft, a plurality of disk-carrying shafts arranged at an inclination with respect to said shaft and suitably supported therefrom and a plurality of cutter disks on each of said disk-carrying shafts.

10. In a cutter head for dredges, a shaft, a plurality of disk-carrying shafts supported from the first mentioned shaft at an inclination thereto, and a plurality of cutter disks on each of said disk-carrying shafts.

In testimony whereof we affix our signatures in presence of two witnesses.

WILLIAM JAMES KNIGHT.
EDWIN SAMUEL JOHNSON.

Witnesses:
L. SONNTAG,
C. P. SONNTAG.